UNITED STATES PATENT OFFICE.

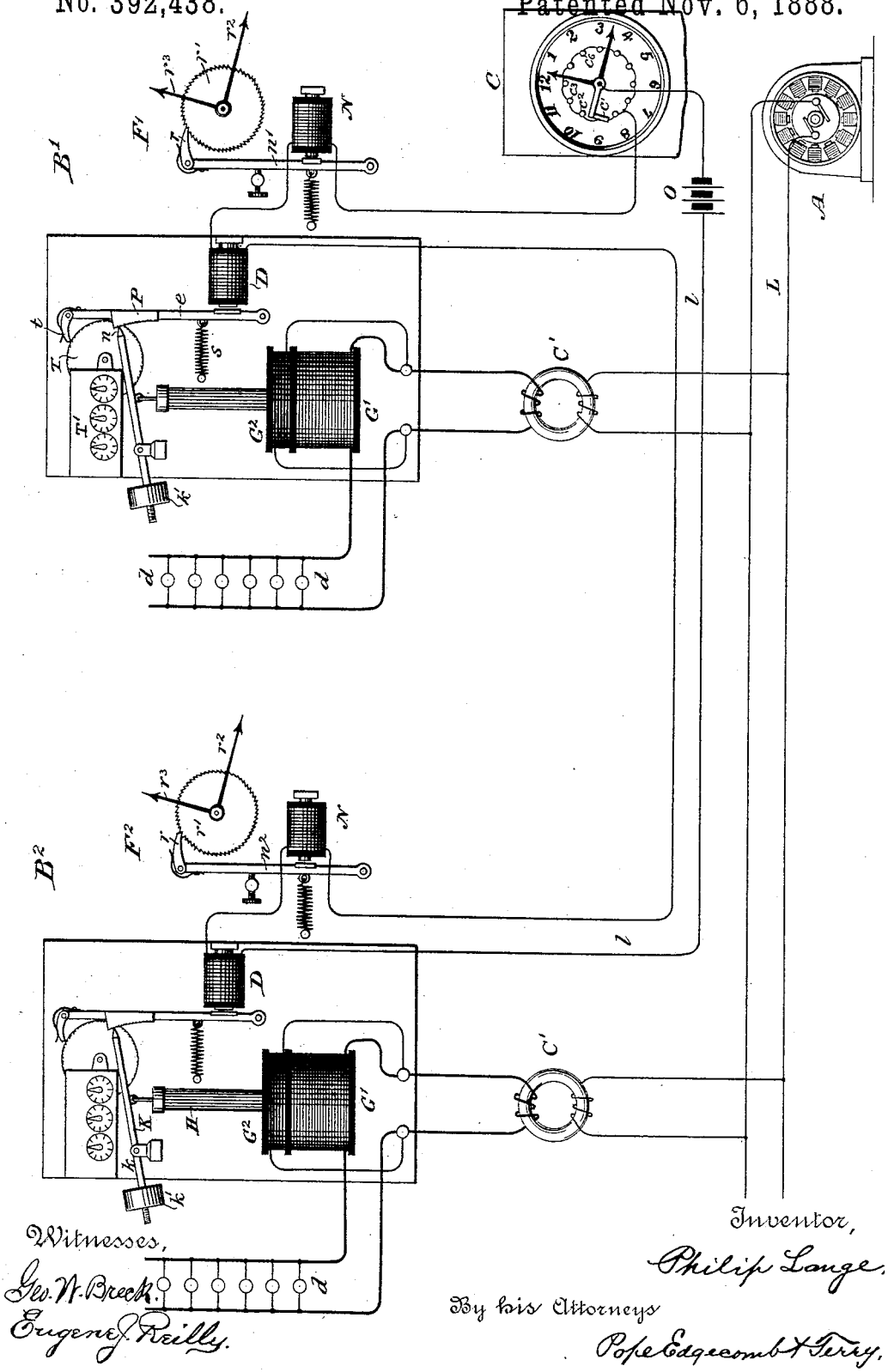

PHILIP LANGE, OF PITTSBURG, PENNSYLVANIA, ASSIGNOR TO THE WESTINGHOUSE ELECTRIC COMPANY, OF SAME PLACE.

COMBINED ELECTRIC METER AND ELECTRIC-CLOCK SYSTEM.

SPECIFICATION forming part of Letters Patent No. 392,438, dated November 6, 1888.

Application filed March 20, 1888. Serial No. 267,799. (No model.)

*To all whom it may concern:*

Be it known that I, PHILIP LANGE, a citizen of the United States, residing in Pittsburg, in the county of Allegheny, in the State of Pennsylvania, have invented certain new and useful Improvements in Combined Electric Meter and Electric-Clock System, (Case 202,) of which the following is a specification.

The invention relates to an organization of apparatus and devices employed for measuring electric currents and recording the current consumed; and the object is to provide reliable and convenient means for indicating time by means of electric currents transmitted over the same circuit, and also affording means convenient to the recording device or meter for indicating whether or not the operation of the meter has been accurate.

The invention consists in providing suitable means for periodically placing a meter in position to be operated by the currents traversing it, and at the same time storing up a force sufficient to move the recording device a distance corresponding to and dependent upon the current at that time being used through the instrumentality of electric currents or impulses periodically sent over an independent circuit, and in connecting in such circuit secondary electric clocks of suitable character, which will be operated by the currents transmitted over the circuit. In another application filed by me on the 21st day of January, 1888, Serial No. 261,439, there is described a meter system of the character to which the present invention is applied.

The accompanying drawing is a diagram showing the general organization of circuits and apparatus for carrying out the invention.

Referring to the figure, A represents a suitable source of electric currents, and L its circuit. The conductor L leads to the several stations represented at $B'$ $B^2$. A second conductor, $l$, leads from the central station to the stations $B'$ and $B^2$. In this conductor there is included at the central station a suitable automatic circuit-controlling device—such, for instance, as is shown at C. This is operated to close the circuit-connections of a battery or other suitable source of electricity, as indicated at O, at stated intervals—for instance, every five minutes or other desired times. This device C may consist of a mechanical clock-train having a circuit-closing attachment of any well-known character. A device for this purpose is represented by the contact-arm $c'$ and contact-points $c^2$ $c^3$ $c^4$, &c., located at the proper intervals. The contact-arm revolves at a regulated speed, and is connected with one pole of the source O. The several contact-points are connected together and with the line $l$, which, passing through the several stations, returns to the remaining pole of the source O.

In the conductor $l$ there is included, at each station, an electro-magnet, as shown at D D. These are employed for setting in operation or controlling the meters at the different stations.

Each meter consists of two coils, $G'$ and $G^2$, the former of which is included in series with the translating devices $d$ $d$, supplied in this instance through the converters $C'$ $C'$ from the circuit L. The coil $G^2$ is included in a shunt-circuit upon the devices. These coils are provided with a core, H, which is preferably of soft-iron wires electrically insulated from each other. The core is suspended from a lever, K, which is carried upon a knife edge or pivot, $k$. A counterpoise, $k'$, is adjustable upon the lever, and this serves to balance both the weight of the core and the pull exerted by the current normally traversing the shunt-coil $G^2$.

The lever K carries a point or knife-edge, $n$, which moves in front of the face of a curved plate, P, as the core is moved within the coils. The plate P is carried upon a lever, $e$, of the electro-magnet D. The face of the plate is indented, roughened, or corrugated, so that the point will not slip along its surface when the two are in contact. A spring or weight, $s$, tends to hold the lever away from its magnet with the plate resting against its point. When the magnet is vitalized, the point is released by the movement of the lever toward the magnet. The lever K thereupon adjusts itself to whatever position the current traversing the coil $G'$ may require. Upon the interruption of the current through the magnet D the lever $e$ will move under the influence of the spring or weight $s$ until the plate P comes in contact with the point $n$ at the end of the lever K.

Upon the lever $e$ there is carried a pawl, $t$, which engages the teeth of a wheel, T. This wheel will therefore be turned forward a distance dependent upon the movement of the lever from its magnet, and therefore, since this movement is greater or less, accordingly as the core H is drawn a greater or less distance into the coils G' and G², a corresponding registration will be made upon the train T'. This train, it is evident, may be of any suitable character. Thus there are here shown three dials having indicators.

It is obvious that by varying the form of the curve of the plate P the rate of movement of the wheel T may be varied, and the apparatus thereby adapted to the requirements of any particular case. It will be noticed that the lever K will be locked by the plate P at all times except when the electro-magnet is vitalized. The duration of the current through the magnet will determine the length of time the magnet will hold the plate P away from the lever and allow it to adjust itself; but when the armature-lever is released the lever K will be locked by the plate until the next impulse is sent.

It will be evident that it is important for the purpose of correct registration by this meter that the impulses shall be at predetermined regular intervals, for were the impulses through the circuit $l$ to succeed each other with greater frequency than that for which the instrument is constructed, then the registration will be too great. If they occur at less frequent intervals, the meter will not indicate the full amount of current consumed. In order that it may be noted at each meter whether or not the apparatus has operated properly, a secondary electric clock may be employed in connection with each meter, as indicated at F' F². These clocks may be of any suitable character. Thus they may each consist of an electro-magnet, N, included in the conductor $l$, and provided with a lever, $n'$, carrying a pawl, $r$, which engages a suitable time-train. The clock-train is so organized that each movement of the lever $n'$ will carry forward the hands $r^2$ and $r^3$ a distance equivalent to the time which intervenes between the two successive impulses. Thus if the impulses are sent every minute, then the lever $n'$ will be moved each minute and carry forward the minute-hand $r^2$ one-sixtieth of the circumference of the dial and the hour-hand $r^3$ a proportional distance. It will now be evident that should the impulses for any reason occur more frequently than once a minute, then the clock will gain upon the true time, and by an inspection thereof it will be readily determined whether or not the meter has kept a correct record of the current. If the impulses have occurred too frequently, then the clock will be ahead of the true time and a corresponding amount may be deducted from the registration of the meter, and in case the clock has lost time the registration of the meter should be increased or added to.

It is evident that the impulses may occur at other intervals than once a minute. Thus in many instances once in five minutes will be sufficiently frequent, and the secondary clock will then be constructed to move forward a corresponding distance at each impulse. The clocks thus not only serve as a check upon the meters, but also as indicators of time, and the circuit-closing device at the central station being carefully constructed and regulated, a useful clock system will be combined with the meter system.

I claim as my invention—

1. The combination, with an electric meter and an electro-magnet for periodically operating the same, of a secondary electric clock actuated each time the meter is operated, substantially as described.

2. The combination, with an electric meter, a lever for actuating the same, an electro-magnet for periodically moving the lever, and a locking-train actuated by the lever, of an electric-clock movement and means for actuating the same each time the meter is actuated.

3. The combination of a solenoid, a core acted upon thereby, a limiting-stop set in position by means of the core, a recording-wheel, a lever for actuating the same, means for periodically moving the lever a distance dependent upon the position of said limiting-stop, and thereby actuating the recording-wheel, and an electric-clock movement operated simultaneously with the operations of said lever.

4. The combination of a solenoid, a core acted upon thereby, a limiting-stop set in position by means of the core, a recording-wheel, a lever for actuating the same, a clock-movement, an electro-magnet for operating the clock-movement, and means for vitalizing the electro-magnet each time the meter is operated.

5. The combination of a solenoid, a core acted upon thereby, a recording-wheel, a lever for actuating the same, an electro-magnet for actuating the lever, an electric circuit including the electro-magnet, means for sending impulses periodically through said electro-magnet, and thereby causing the lever to move the recording-wheel a distance dependent upon the position of the limiting-stop, and a secondary electric clock included in said circuit.

6. In a system of electric distribution, the combination of a registering or indicating mechanism, a lever for imparting motion to said mechanism, a movable core or armature whose position serves to regulate the extent of movement of said lever, and consequently the registering or indicating mechanism controlled thereby, a coil or helix traversed by the current to be measured, and by which the position of said core or armature is determined, an electro-magnet whereby said lever is operated, an electric circuit including said magnet, and an electric clock included in said circuit.

7. The combination of a series of electric meters, a circuit traversed by the current which said meters register, an independent circuit for operating the meters, and a series of electric clocks having their actuating-magnets included in the independent circuit.

8. The combination, with an electric meter and an electro-magnet for periodically operating the same, of an indicating-movement actuated each time the meter is operated, thereby registering the number of times the meter is operated.

In testimony whereof I have hereunto subscribed my name this 13th day of February, A. D. 1888.

PHILIP LANGE.

Witnesses:
W. D. UPTEGRAFF,
DANL. W. EDGECOMB.